April 7, 1970  R. E. WOODCOCK  3,505,062
METHOD FOR POSITIONING AN OXYGEN LANCE
Original Filed Oct. 24, 1965

INVENTOR.
RAY E. WOODCOCK.
BY
James A. Bernsburg
his ATTORNEY.

3,505,062
METHOD FOR POSITIONING AN OXYGEN LANCE

Ray Edwin Woodcock, Tarentum, Pa., assignor to Allegheny Ludlum Steel Corporation, Brackenridge, Pa., a corporation of Pennsylvania
Original application Oct. 24, 1965, Ser. No. 504,772, now Patent No. 3,395,908, dated Aug. 6, 1968. Divided and this application Feb. 29, 1968, Ser. No. 709,467
Int. Cl. C21c 5/32
U.S. Cl. 75—60                                                    1 Claim

ABSTRACT OF THE DISCLOSURE

A method for positioning an oxygen lance in a basic oxygen converter utilizing conductive rods attached to and extending unequal distances below the lower end of the lance so that the level of the liquid metal can be detected through the slag. Based on this determination, which establishes a reference position for the lance tip above the liquid metal, the lance can be positioned as desired to give maximum effect to the oxygen blow.

CROSS-REFERENCE TO RELATED APPLICATIONS

This is a division of application Ser. No. 504,772 filed Oct. 24, 1965, now Patent No. 3,395,908.

BACKGROUND OF THE INVENTION

This invention relates to a method for positioning an oxygen lance within a basic oxygen converter.

In the basic oxygen furnace process, molten metal is introduced into a vessel and a premeasured amount of scrap metal is added. The scrap metal will generally gravitate to the bottom of the vessel, the scrap metal quantity generally being of a magnitude less than that of the molten metal. Floating on top of the molten metal is a slag layer which is usually introduced along with the molten metal. The thickness of the slag layer varies from melt to melt, thereby making it difficult to ascertain the specific level of the molten metal. After the proper ingredients are contained within the vessel, a tube, known as an "oxygen lance," is introduced into close proximity with the molten metal, whereupon oxygen is released into the vessel to oxidize impurities in the metal and to create a chemical reaction with the metal, resulting in an increased amount of heat which aids in melting the scrap metal. Inasmuch as the velocity of the oxygen emanating from the oxygen lance is critical and controlled within limits, it is necessary to know the exact height of the lance tip above the slag-metal line. The oxygen must not only be able to separate the slag, but it must be able to penetrate the molten metal to a sufficient depth to create the chemical reaction and, additionally, to impart a circulatory movement to the molten metal itself. Consequently, it is important that the position of the lance tip be known at the start of the blow with a fair degree of accuracy.

Accordingly, it is an object of this invention to provide a method for positioning an oxygen lance within a basic oxygen converter.

It is another object of this invention to provide a method for positioning an oxygen lance a given distance above the slag metal line regardless of the thickness of the slag layer.

SUMMARY OF THE INVENTION

The foregoing objects of this invention are accomplished by providing a pair of conductive rods affixed to and insulated from the oxygen lance. A first conductive rod extends below the lance tip a known distance. The second conductive rod extends below the first rod some arbitrary distance. The upper ends of the conductive rods are electrically connected to a level indicator which may consist of an ohmmeter, or as an alternative, a voltage source and an ammeter. As the lance is lowered toward the hot metal, the rods contact first the slag layer, and due to the conductivity of the slag, some indication is given on the level indicator. However, due to the greater conductivity of the hot metal when the first conductive rod makes contact with the slag-metal line, an indication is given by the indicator which establishes a reference position for the lance tip above the hot metal line. Changes in the height of the lance with respect to the hot metal can then be made as desired.

BRIEF DESCRIPTION OF THE DRAWINGS

Further objects, features and advantages of the invention will become apparent from the following description when taken in conjunction with the accompanying drawings in which.

DESCRIPTION OF THE PREFERRED EMBODIMENT

Figure 1:
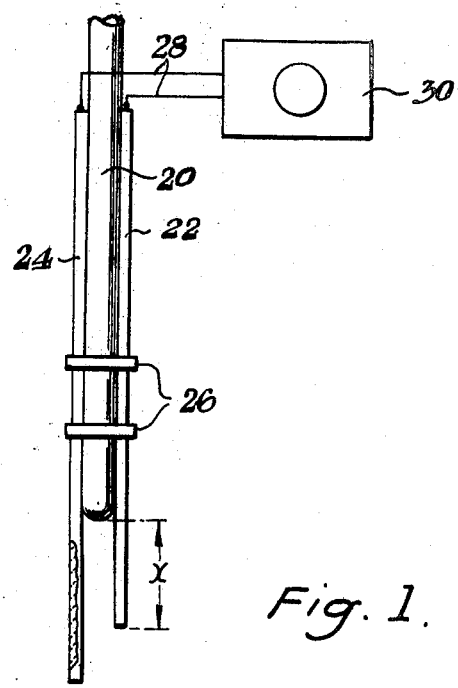
FIGURE 1 is a front elevation of the lance and conducting rods, partially schematic with a portion broken away to show detail
Figure 2:
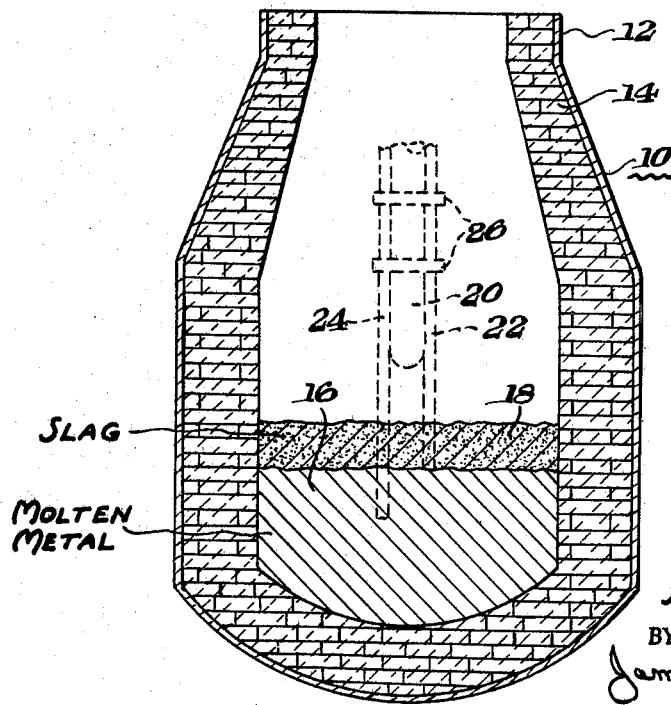
FIG. 2 is a cross-sectional view of a converter showing the lance and conducting rods in liquid metal level detection position.

Referring now to the drawing, there is shown a vessel generally designated as 10 which is composed of an outer steel shell 12 and an inner fire brick lining 14. Within the vessel 10 is a bath of molten metal 16 which contains the scrap metal charge (not shown) and floating on top of the metal 16 is a layer of slag 18 which thickness can vary. An oxygen lance 20 (partially shown) is depicted in its raised position prior to the start of the blow. Affixed thereto is a pair of conductive rods 22 and 24, the rods being made of steel and suitably insulated with an asbestos covering which serves as a thermal insulation as well as an electrical insulation. As shown in the drawing, the conductive rods 22 and 24 are spaced 180° apart, although the spacing around the circumference of the lance 20 is not critical but is shown merely for illustrative purposes. The first conductive rod 22 is positioned so that it extends below the tip of the oxygen lance 20 a specified known distance designated as X on the drawing. The second conductive rod 24 extends below the first rod 22 an additional distance so that the second rod 24 comes into contact with the molten metal first, thus insuring positive indication when the first rod 22 ultimately comes into contact with the metal bath 16. The conductive rods 22 and 24 are secured to the lance 20 by any suitable means, such as bands 26. The upper ends of the conductive rods 22 and 24 are electrically connected to a remote level indicator 30 by a pair of electrical conductors 28. The remote level indicator 30 is a conductivity sensitive device such as an ohmmeter, or as an alternative, it may consist of a voltage source in series with an ammeter and both connected in series with the conductive rods 22 and 24. Thus, there is a series circuit from one rod 24 through its respective conductor 28, to one terminal of the level indicator 30 to the other terminal of level indicator 30, through the other conductor 28 and the conductive rod 22, the circuit being completed by the molten metal 16.

In operation, the lance 20 is lowered into the vessel 10, and when the second conductive rod 20 comes into contact with the slag layer, a reading is given on the indicator 30. However, due to the greater conductivity of the metal 16 as compared with the slag 18 upon further travel of lance 20, the indicator 30 will show an abrupt change in reading when both conductive rods 22 and 24 have reached the top of the hot metal bath 16 (this position being indicated on the drawing by dotted lines). This establishes a reference for lance positioning at the actual height of the hot metal bath 16. At this time the lance 20 can then be raised to the desired height above the bath, and the flow of oxygen is started through the lance 20 to begin the blow. Inasmuch as the conductive rods 22 and 24 are usually melted off during the blow, the apparatus is constructed so that the conductive rods 22 and 24 can readily be changed between blows.

While there has been shown and described a specific embodiment as required by the patent statutes, other adaptations and modifications may be made without departing from the spirit and scope of the invention.

I claim:

1. In the method of refining metal in a basic oxygen furnace wherein oxygen-containing gas is supplied to the furnace through a vertically movable lance adapted to be positioned above the level of molten metal contained in said furnace, the improvement comprising positioning said lance above said metal bath by lowering within said furnace said lance having affixed thereto two insulated electrically conductive members in known fixed position with respect to the discharge end of said lance, said electrically conductive members being connected to an open electrical circuit, containing a voltage source, independent of the furnace structure, contacting said electrically conductive members with the molten metal contained in said furnace without contacting the lance with said metal and closing said electrical circuit whereby current is passed through said circuit indicating the position of said lance with respect to said molten metal and vertically adjusting the location of said discharge end of said lance to a desired predetermined distance above said molten metal in response to said indication.

References Cited

UNITED STATES PATENTS

| | | | |
|---|---|---|---|
| 2,883,279 | 4/1959 | Graef et al. | 75—59 |
| 3,372,023 | 3/1968 | Krainer et al. | 75—60 |
| 3,378,366 | 4/1968 | Borowski et al. | 75—60 |

L. DEWAYNE RUTLEDGE, Primary Examiner

G. K. WHITE, Assistant Examiner